United States Patent [19]

Grimm et al.

[11] Patent Number: 4,876,790

[45] Date of Patent: Oct. 31, 1989

[54] MAGNETIC INFORMATION RECORDING AND/OR READING HEAD WITH INCREASED WEAR-RESISTANT PROPERTIES AND A METHOD FOR MANUFACTURING THE SAME

[75] Inventors: Istvan Grimm; Sandor Stenczinger; Istvan Bolla, all of Budapest; Istvan Csanyi, Dunakeszi, all of Hungary

[73] Assignee: Budapesti Radiotechnikai Gyar, Budapest, Hungary

[21] Appl. No.: 170,681

[22] PCT Filed: Nov. 9, 1984

[86] PCT No.: PCT/HU84/00053

§ 371 Date: Sep. 5, 1985

§ 102(e) Date: Sep. 5, 1985

[87] PCT Pub. No.: WO85/02289

PCT Pub. Date: May 23, 1985

Related U.S. Application Data

[63] Continuation of Ser. No. 770,863, Jul. 11, 1985, abandoned.

[30] Foreign Application Priority Data

Nov. 11, 1983 [HU] Hungary .............................. 3862/83

[51] Int. Cl.[4] ................................................ G11B 5/42
[52] U.S. Cl. ........................................ 29/603; 360/126
[58] Field of Search .................. 29/603; 360/122, 126, 360/127

[56] References Cited

U.S. PATENT DOCUMENTS

| | | | |
|---|---|---|---|
| 2,850,582 | 9/1958 | DeRaemy | 360/126 |
| 3,683,126 | 8/1972 | Krause | 360/126 |
| 4,156,882 | 5/1979 | Delagi et al. | 360/126 |

Primary Examiner—Carl E. Hall
Attorney, Agent, or Firm—Young & Thompson

[57] ABSTRACT

A magnetic head for information recording and/or reading which comprises a pair of half poles (10,11) each consisting of a plurality of soft iron sheets (12) having predetermined profiles. The half poles are attached to each other to define an air gap (13) in front of a magnetic carrier (16). A coil (15) is arranged on the core. Thin hard coatings (18) are deposited on the surfaces of the sheets (12) at least in the region of the air gap and the frontal contact zone (17) with the carrier, whereby a laminated sandwich structure is obtained, in which the hardness is periodically changing along the width of the carrier. Owing to the rigidity of the carrier, the hard coatings resist to wear caused by the sliding movement of the carrier. The presence of the thin coatings does not decrease the resulting permeability of the core. The coating is deposited by means of high rate reactive cathode sputtering technique, which provides for optimum hardness and cohesion to the iron substrate. A preferable coating material is titanium nitride.

9 Claims, 2 Drawing Sheets

MAGNETIC INFORMATION RECORDING AND/OR READING HEAD WITH INCREASED WEAR-RESISTANT PROPERTIES AND A METHOD FOR MANUFACTURING THE SAME

This application is a continuation of application Ser. No. 770,863, filed 7/11/85 now abandoned.

The invention relates to magnetic information recording and playback technique, more particularly to a method for producing a magnetic head usable for information recording playback. The term "information recording" covers sound recording on a magnetic carrier, video recording technique, as well as digital information recording. For the sake of simplicity the examples disclosed in the present specification will relate to conventional tape recording applications, however, any other recording and reading application is considered as equivalent.

The development of information recording technique has created a small number of head types.

A conventional and widely used head comprises a magnetic core made of profiles soft-iron sheets in a laminated arrangement, and there is provided an air gap between the sheets just across the frontal zone which abuts the magnetic carrier. A coil is wound around the core for connection with appropriate electronic circuits. Such heads are held in a head support and have a magnetic shielding around them. These heads proved to be popular, they had fairly good electrical properties (at least in sound recording applications) and their manufacture was not too expensive. A basic drawback of such heads was that the soft core material was soon worn by the frictional effects of the tape.

The development of the art has introduced chromium-dioxide and metal tape materials which have been much harder than normal tapes, and the laminated cores were unable to endure the wear caused by such medias.

In an improved technology a hard coating is provided on such heads, whereby the surface hardness has become sufficiently high. The problem with such heads lies in that the coating material increases the effective air gap to twice its thickness, and in most applications the high frequency response of the recording has become much worse than without such coatings.

Another head strucure family is based on the use of ferrite or glass ceramic materials. These materials have sufficient hardness to endure increased wear and they are also preferable regarding their frequency response. A drawback with such heads lies in the comparatively low value of permeability, whereby their electric signals are at a lower level than in case of permalloy cores. The greatest drawback of such heads lies in the difficulties during manufacture. These hard materials are hard to be formed and tooled, and their production is costly and it requires much time and work. A further drawback of such heads lies in their low heat conductivity. In operation, the effect of friction might cause extreme temperatures in the vicinity of the air gap, and at their elevated temperatures a recrystallisation might take place at the boundary surface of the glass and the ferrite material, which virtually increases the air gap and decreases frequency response. The thermal stresses may often lead to small cracks which mean the end of their useful life.

The object of the invention is to provide a method for producing a magnetic head which not only has good electrical properties, but can be manufactured with reasonable costs and has improved wear-resistant properties.

The invention is based on the discovery that for increasing the hardness of the soft-cored heads, the hard material should be arranged between the soft-iron sheets rather than on the head. If a hard material like e.g. titanium nitride is deposited on the main surface of the iron sheets forming the core, then the hardness of the so-obtained laminar sandwich structure will vary along the width of the information carrier (the tape) as a comb-like function. Since the tape has sufficient rigidity in the stretched state over small distances, the tape is sliding on the hard edges only and causing no wear to the soft iron material between the hard coatings.

This effect is similar to the passing of the wheels of a car above the grating of a sewer or the like. The wheel cannot get in between the iron rails if the rails are arranged in a sufficient density.

It has been experienced that even as thin coatings as a half micron or less could provide an increased resulting hardness. If the thickness of the coating is above about 2 microns, the resulting hardness will not increase significantly with increasing coating thickness. The arrangement of the hard material between the sheets results in a further advantage, i.e. the structure remains unchanged after some wear. While the front-deposited hard layer was destroyed following a wear of about 1 micron, the sandwich structure according to the invention preserves its hardness throughout the depth of the air gap.

It is preferable if the hard coating is made by deposition, especially by high rate reactive cathode sputtering. This manufacture can provide for controlled physical properties by means of appropriate process control during deposition.

The Vickers hardness of the surface can be as high as $HV_{10} = 3000$ kp/mm$^2$ which is twenty times as high as that of the soft iron material.

The resulting wear properties of the head according to the invention are just as good as those of ferrite and ceramic heads, while the higher resulting permeability of the core material results in higher signal levels, thus better signal to noise ratios. The deposition step does not add significant costs to the well-known manufacturing technology of soft iron cored heads, which means that these heads can be manufactured with reasonable costs.

Several other properties and advantages of the present invention will be described in connection with preferable embodiments thereof, in which reference will be made to the accompanying drawings. In the drawings.

Figure 3:
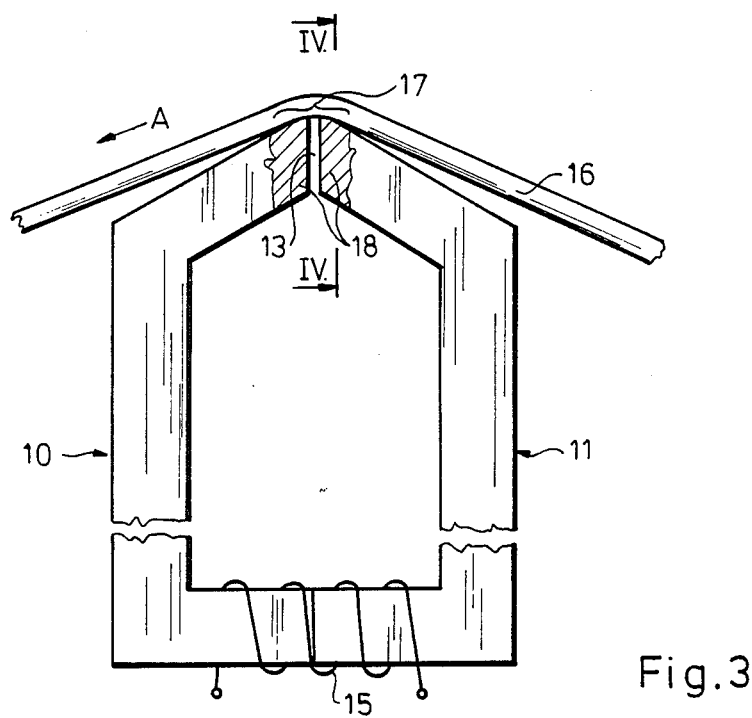
Figure 4:
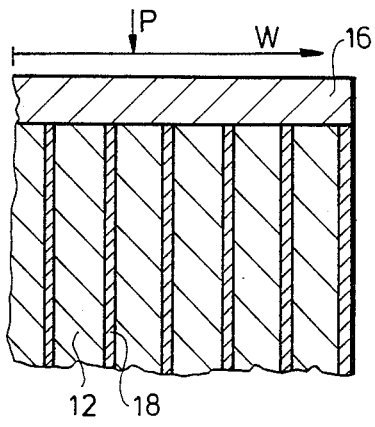
Figure 6:
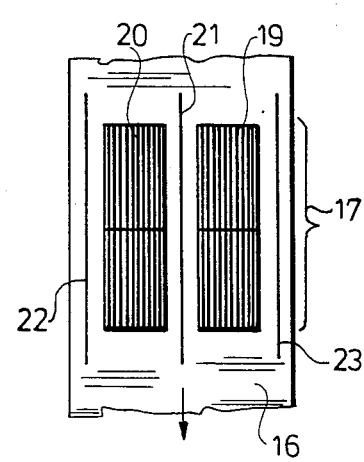
Figure 5:
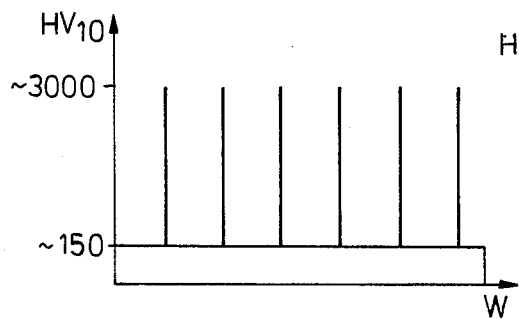
Figure 8:
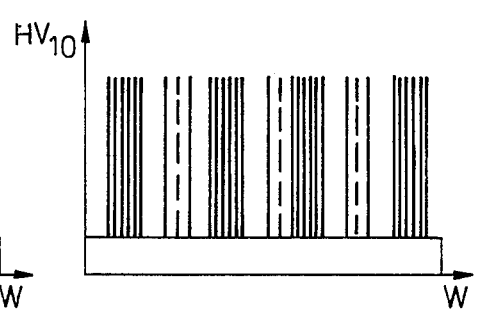
Figure 7:
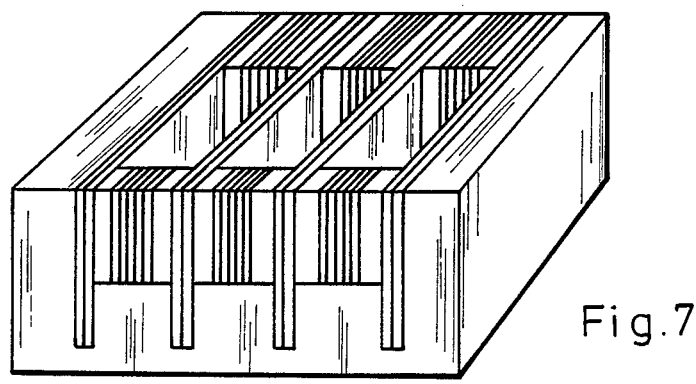

FIG. 3 is a schematic arrangement of a head and a tape during operation on an enlarged scale for visualisation, FIG. 4 is an enlarged sectional view taken along line IV—IV of FIG. 3, FIG. 5 is a hardness versus width curve for the structure of FIG. 4, FIG. 6 is an enlarged top view of the frontal zone of FIG. 3 viewed across the tape, FIG. 7 is a schematic perspective view of a multichannel head assembly, and FIG. 8 is a hardness curve similar to FIG. 5 for the head of FIG. 7.

Figures 1, 2:
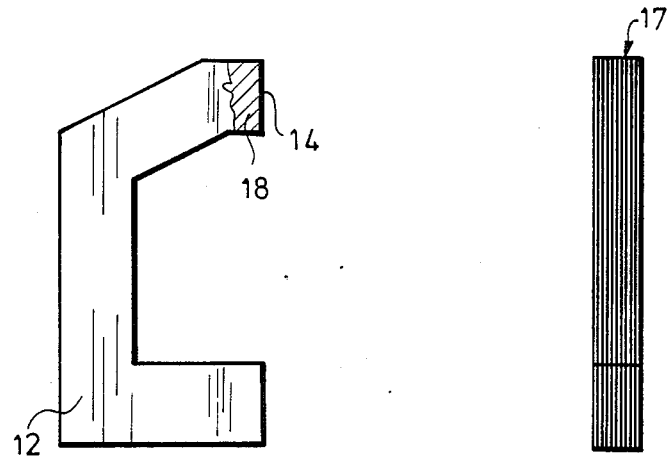
FIG. 1 is an enlarged elevation view of a half core.
FIG. 2 is a side view of FIG. 1.

FIGS. 1, 2 and 3 show schematically the magnetic poles of a recording/reading head made according to the invention. The head comprises a pair of half-poles 10, 11 each comprising a plurality of profile sheets 12 of a soft iron material with high magnetic permeabiliy. The sheets 12 are stacked and fixed together by means of an adhesive bonding. The two half-poles 10, 11 are attached to each other as shown in FIG. 3 and an air gap 13 is defined between them by inserting a non-magnetic foil between their lateral side surfaces (surface 14 in FIG. 1). The width of the air gap 13 is in the micron range and typically falls between about 0.6 and 10 microns. The height of the lateral surface 14 defines the full depth of the air gap 13. A coil 15 is arranged on the half poles which serves as a pick up coil in playback mode and as a magnetizing coil in recording mode.

FIG. 3 shows the head in operation when tape 16 is pressed aginst frontal zone 17 and the tape is moving with a predetermined speed in the direction of arrow A. The frontal zone 17 of the head is made preferably by a grinding operation and its profile is tooled to provide an optimum guidance for the tape 16.

The head shown in FIGS. 1 to 3 resembles conventional heads with laminated core, e.g. such as described in the book of Dipl. Ing. Christian Scholz "Magnetbandspeichertechnik" (VEB Verlag Technik, Berlin, 1969, pp. 211-236) or used widely in commercial tape recorders. A basic difference between the head according to the invention and the conventional ones lies in that each sheet 12 comprises a coating 18 on its surface at least in the region defined by the depth of the air gap 13 and the frontal zone 17. The coating 18 is made of a hard material which has an increased resistivity against abrasion.

The coating can be made by means of conventional vapour deposition technique such as ion plating or cathode sputtering. Since magnetic heads are manufactured by massproduction, it is preferable if the coating 18 is made by means of high-rate cathode sputtering technique which offers not only a high productivity but also a uniform coating thickness, a perfect adhesion to the substrate material and controllable coating properties. The high-rate cathode sputtering technique is well-known in the art, and it is widely used for various applications including the hardening of cutting edges, coating watch-cases and bracelets and thin-film technique. The high-rate cathode sputtering is described in detail e.g. in the paper of W. D. Münz and G. Hessberger entitled "Production of hard titanium nitride layers by means of high-rate cathode sputtering" published by Leybold-Heraeus GmbH. (FRG). In this technique a magnetic field of special distribution is applied to the target, whereby the electrons are concentrated in front of the target and high particle densities are obtained that lead to a reduction in the discharge voltage and lead to higher sputtering rate. For producing very hard layers the use of reactive cathode sputtering is preferable. This technique is used when oxides, nitrides or carbides of a metallic basic material should be deposited. The basic material, e.g. titanium is used as target. The atmosphere in the discharge chamber is a mixture of an inert gate like argon and a reactive gas, e.g. nitrogen. During the sputtering process the reactive gas reacts with the target, and is either resputtered from this, or becomes integrated in the sputtered layer during the condensation of the metal atoms. The hardness of the layer depends largely on the partial pressure of the reactive gas, and by means of an appropriate process control optimum hardness can be achieved.

In making the coating 18, the sheets 12 are fed in the discharge chamber and are used as substrates. The coating process is facilitated if a pair of high-rate cathodes are mounted in an opposite position and the substrates are placed in the middle zone between the two cathodes. A preferably equipment for making such coatings is the Modular In-Line Sputtering Z 600 of the Leybold-Hereaus GmbH.

A preferable coating is titanium nitride which can have a hardness $HV_{10}$ about 3000 kp/mm$^2$ if the partial pressure of the nitrogen is about 5 to 10·10$^{-4}$ mbar. Similarly hard layers can be obtained by using other kinds of films, such as chromium nitride, silicon carbide, tantalum nitride, tungsten nitride and other hard compounds. The hardness and oxidation behaviour of such compounds is analyzed in the paper of W. D. Müntz and J. Göbel "Oxidation behaviour of high rate sputtered TiN, TiC, TiCN, CrN and WN films" published during the 11th ICMC conference in San Diego (Calif.) 1984. There are also a number of publications which deal with the deposition of hard films on metal substrates, therefore the invention cannot be limited to any particular compound.

It should be mentioned that the high-rate reactive cathode sputtering technique provides for an extremely good cohesion between the substrate and the coating, and this cohesion can surely endure the force and temperature conditions that prevail in the engagement zone 17 between the tape and the head.

Reference will be made now to FIG. 4 which shows the enlarged sectional view along line IV—IV of FIG. 3. The scale is distorted for the sake of better illustration. The tape 16 moves normal to the plane of the drawing and presses the head with pressure P. The support surface of the head consists of a laminar sandwich-like structure of the iron sheets 12 and the coatings 18 thereon. The thickness of the sheets is between about 0.1-0.15 mm, while that of the coating is in the micron range, preferably at least 1 micron. The Vickers hardness $HV_{10}$ of the structure measured along the tape width w can be seen in FIG. 5 in kp/mm$^2$ units. The resulting hardness versus width curve is a comb-like formation with about 3000 kp/mm$^2$ peak and 150 kp/mm$^2$ basic hardness values. It has been experienced that due to the rigidity of the tape material in the short distance between adjacent spaced hard coatings, the resulting hardness of the structure is defined by the coating material and the soft iron sheets 12 have practically no functional role in determining the surface abrasion. The significant increases in hardness is experienced even if the thickness of the coating was a fragment of a micron, for safety reasons, however, it is preferable if the coating 18 is at least about 0.5 to 1 micron, preferably two microns thick. There is no further hardening effect if the coating thickness is increased beyond this value, however, one can produce thicker coatings, too. The soft-iron sheets 12 provide for a good support for the thin coatings, therefore this latter is definitely fixed between the sheets. Since the sheets 12 are made of a heat-conducting metal, the heat generated by the friction between the tape and the head will be transported away, therefore remarkable local temperature gradients cannot occur. If the head structure becomes abraded the sandwich structure remains unchanged and the full depth of the head in the region of the air gap 13 can be utilized. These factors explain why the expected life-time of the head according to the invention has increased substantially compared to that of conventional heads of laminated iron sheets.

FIG. 6 shows the top view of the engagement area viewed through the tape in the case of a double track head. In the engagement zone 17 between the head and the tape there are two sandwich structures 19 and 20, respectively and each of them consists of a plurality of sheets 12 and associated coatings 18. The tape 16 is wider than the tracks and a magnetic shielding 21 is arranged between the tracks. It is preferable if the shielding 21 is also made of the high permeability iron sheet and it is covered by a coating either on one face or on both. By providing a hard coating on the shield, the hazard of a magnetic short-circuit between the tracks is eliminated, since the coating is made of a non-magnetic material. In addition to this advantage, the coating on the shield 21 can provide a further support for the tape. FIG. 6 shows further two optional coated sheets 22, 23 on both sides of the structures 19 and 20, which can be located in the support material of the head made generally of copper. The use of coated sheets 22 and 23 can provide further supports for the tape 16.

While the coating 18 was mentioned as a layer deposited on the surface of the pole sheets, it can well be understood, that separate foils, e.g. tungsten foils or foils of any other hard material can be used instead of the deposited coating. With present technologies, however, the deposited coating seems to be far more favourable than separate foils.

The sheets can be coated on both sides or on one side only, or one might use coated and uncoated sheets alternatingly. The important thing is to arrange the hard edges with such spacings that the resulting surface hardness of the frontal zone be defined decisively by them. It is often preferable if the full surfaces of the sheets 12 are coated.

The plane of the sheets 12 and of the coatings 18 need not be normal to the direction of the tape movement. A tilting on either directions or a tilting relative to the plane of the tape is possible. There are several magnetic head arrangements, in which tilted heads are used for obtaining increased channel separation. The presence of the coating 18 dose not limit the conventional possibilities for arranging the head relative to the tape.

FIG. 7 shows a simplified perspective view of a multi-channel head with a number of pole structures each comprising sheets coated with a hard film. The magnetic shieldings between the channels comprise also hard coatings. The hardness versus width curve is shown in FIG. 8, in which the dashed lines correspond to the shield plates between the channels.

According to the invention the hardness of softiron heads has been increased, whereby the lifetime has been increased by a factor of 4 to 8 and such heads can as well be used with chromium dioxide and metal tapes as with ferrite and glass ceramic heads. The good magnetic properties of permalloy-cored heads remain unchanged, sine the small amount of non-magnetic coatings cannot decrease the active iron mass to a noticable extent. The insulating properties of the coating can decrease the eddycurrent losses, since any current flow between the sheet is safely blocked. A further advantage lies in the preservation of the high production rate of conventional sheet-cored heads for manufacturing high quality, long life magnetic heads.

We claim:

1. A method for producing magnetic recording and/or playback heads with improved abrasion resistance for use with a magnetic record medium having a magnetizable surface for retaining information in the form of a pattern of magnetization, comprising the steps of:
   (a) providing pole sheets of predetermined shape made of a material with high magnetic permeability, each sheet having a frontal zone for sliding engagement with said recording medium and a lateral surface substantially normal to said frontal zone for defining a side of a pole gap;
   (b) providing a hard layer on at least one surface of said sheets extends to said frontal zone by means of high rate reactive cathode sputtering, said layer having a substantially uniform thickness in the range of 0.5 to 2.0 micrometer, having a Vickers hardness corresponding to the hardness exhibited by titanium nitride, chromium nitride, silicon carbide, tantalum nitride or tungsten nitride and being of an electrically non-conductive and non-magnetizable material;
   (c) assembling said sheets together to form a pair of half cores in such a way that in each of said half cores said sheets are stacked on each other and at least one of said layers 12 arranged between each pair of sheets in each half core; and
   (d) mounting said half cores together to form said head.

2. The method as claimed in claim 1, wherein said layer covers a whole face of each of said sheets.

3. The method as claimed in claim 1, wherein said layer is comprised of titanium nitride.

4. The method as claimed in claim 1, wherein said layer covers said lateral surface of each of said sheets.

5. The method as claimed in claim 1, wherein said layer has a substantially uniform thickness in the range of 0.5 to 1.0 micrometer.

6. The method as claimed in claim 1, wherein said layer has a substantially uniform thickness of at least 1.0 micrometer.

7. The method as claimed in claim 1, wherein said pole sheets have a thickness in the range of 0.1 to 0.15 mm.

8. The method as claimed in claim 1, wherein said layer has a Vickers hardness of about 3000 kg/mm$^2$.

9. The method as claimed in claim 1, wherein said layer has a Vickers hardness as high as 3000 kp/mm$^2$.

* * * * *